United States Patent Office 3,007,804
Patented Nov. 7, 1961

3,007,804
CERAMIC MATERIAL
Norbert J. Kreidl, Rochester, and Robert A. Weidel, Webster, N.Y., assignors to Bausch & Lomb Incorporated, a corporation of New York
No Drawing. Filed Dec. 18, 1958, Ser. No. 781,216
11 Claims. (Cl. 106—39)

This invention relates to a crystalline ceramic material derived from an aluminate glass-forming composition.

Aluminate glass-forming compositions may be defined as those in which the principal and at times the only aluminate glass forming component is a combination of an aluminum oxide with suitable oxides capable of producing aluminate glass. Aluminate glasses are known particularly to investigators in the study of phase systems but very little is known regarding the nature and behavior of this type of glass which up until now has been little more than a laboratory curiosity.

The present application is based upon our discovery that if a calcium aluminate glass composition which contains a predominant amount of $CaO \cdot AlO_{1.5}$ is subjected to a certain heat treatment the entire mass will crystallize and form an opaque crystalline ceramic material. As compared to ordinary devitrified glass in which the crystals are discontinuously scattered or suspended throughout a continuous amorphous glass phase our ceramic material has an apparently continuous crystalline phase which contains very little, if any, amorphous glass dispersed therein.

In our ceramic material the crystals appear to be very fine-grained and at times of the order of micron size and quite unexpectedly we have found that our crystalline ceramic material is capable of transmitting infrared radiation. As far as we know this is the first time that an opaque crystalline ceramic material capable of transmitting infrared radiation has been derived from a glass-forming composition.

Our new crystalline ceramic material has special light transmitting characteristics in the infrared region of the spectrum and it appears also to have unusually high mechanical and dielectric strength. Our crystalline ceramic material is water insoluble in that it does not decompose in water at ordinary atmospheric temperatures and it may therefore be used in place of the ordinary known ceramic materials as electrical insulating material, in laboratory ware and otherwise and particularly in those cases where the transmission of infrared radiation or the fine grain size and packing indicated by this transmission is desirable. Another characteristic of the ceramic material of our invention is that the softening point of the ceramic material was found to be about 750° F. or more above that of the glass from which it is formed and this is of particular advantage where resistance to heat is an important factor. In some cases the softening point of the glass may be as high as 1650° F.

The crystalline ceramic material of our invention may be formed with the conventional raw materials and equipment customarily used in the manufacture of glass. For example, in accordance with our invention, a calcium aluminate glass-forming composition was made up in a suitable vessel with the following raw materials:

Ingredients: Grams
Limestone _____ 2115
Aluminum hydroxide _____ 2915
Potash _____ 134
Soda ash _____ 259
Magnesium carbonate _____ 109
Barium carbonate _____ 257
Titanium oxide _____ 51.9
Zirconium oxide _____ 80.1
Iron oxide _____ 104
Copper oxide _____ 11.6

The composition had the following molar ratio and weight percent:

*Example 1*

| | Molar Ratio | | Mole Percent | Weight Percent |
|---|---|---|---|---|
| CaO | 32.50 | CaO | 44.30 | 31.04 |
| $AlO_{1.5}$ | 57.50 | $Al_2O_3$ | 39.19 | 49.92 |
| $NaO_{0.5}$ | 7.50 | $Na_2O$ | 5.11 | 3.96 |
| $KO_{0.5}$ | 2.50 | $K_2O$ | 1.70 | 2.00 |
| MgO | 2.00 | MgO | 2.73 | 1.38 |
| BaO | 2.00 | BaO | 2.73 | 5.23 |
| $TiO_2$ | 1.00 | $TiO_2$ | 1.36 | 1.36 |
| $ZrO_2$ | 1.00 | $ZrO_2$ | 1.36 | 2.09 |
| $FeO_{1.5}$ | 2.00 | $Fe_2O_3$ | 1.36 | 2.71 |
| $CuO_{0.5}$ | 0.25 | $Cu_2O$ | 0.170 | 0.304 |

The glass forming composition was then heated in an ordinary melting furnace at a temperature of 2750° F. until a melt formed. The melt was then dropped to 2700° F. and agitated by means of a conventional inclined disc agitator blade rotating at approximately 150 r.p.m. until the melt was homogeneous and free of bubbles. This took about 15 hours and then agitation was discontinued and the melt and furnace were allowed to cool to 2650° F. When the melt had cooled to a temperature of 2650° F. which was just above the liquidus temperature of this particular glass (about 2600° F.) it was poured into a metal die measuring 6 x 6 x 1¼". This slab was then placed in an annealing furnace at 1380° F. and cooled to room temperature on a 24 hour annealing schedule.

The resulting block of glass was sawed into pieces 3 inches square and ¼ of an inch thick and then one of the pieces was reheated to a temperature of 1652° F. and held at this temperature for six hours at which time the amorphous glass changed into an opaque crystalline ceramic material. The finished crystalline ceramic piece had a fine crystalline structure with what appeared to be a continuous crystalline phase. Its dimensions were substantially the same as those of the glass before reheating and upon investigation we found that the piece was capable of transmitting infrared radiation. Infrared transmission through the piece was first observed between 1.75 and 2.00$\mu$ and the transmission increased to a maximum of about 85% between 3.75 and 4.75$\mu$ and finally decreased to extinction near 6.0$\mu$.

As to ingredients, data now available shows that a wide range of different compositions may be employed in making the crystalline material of our invention provided the selected composition upon heating to melt temperature will contain between about 65 to 100 mole percent of calcium aluminate ($CaO \cdot AlO_{1.5}$) and preferably between about 75 to 95 mole percent of $CaO \cdot AlO_{1.5}$. Within the specified range minor substitutes may be used in place of the calcium or aluminum if the substituted element has an ionic radius approximately that of the calcium or aluminum so that it will enter the crystal lattice and provided that the total amount of substituted material does not appreciably exceed about 25 percent of the specified mole percent of calcium aluminate.

The term "substituted elements" as used in the specification and claims is intended to include any element taken from the periodic table which has an ionic radius approximately that of calcium or aluminum and which is capable of entering the crystal lattice of our ceramic material. Some of the substituted elements include iron, barium, magnesium, strontium and zinc. As is customary in the art the substituted elements may be added to the initial mix as the oxide or any raw material may be used which upon the application of heat will liberate the desired oxide.

The remaining 0 to 35 mole percent may include any of the usual ingredients employed in the manufacture of glass or ceramics which upon application of heat produce an element or its oxide in a form compatible with the invention are included in the following additional examples of illustrative compositions:

| Example | II | | III | | IV | | V | |
|---|---|---|---|---|---|---|---|---|
| Molar Ratio | | | | | | | | |
| CaO | 32.5 | | 30.0 | | 30.0 | | 30.0 | |
| $AlO_{1.5}$ | 60.0 | | 50.0 | | 55.0 | | 50.0 | |
| $NaO_{0.5}$ | 5.0 | | 7.5 | | 7.5 | | 7.5 | |
| $KO_{0.5}$ | 2.5 | | 2.5 | | 2.5 | | 2.5 | |
| MgO | 2.0 | | 2.0 | | 2.0 | | 2.0 | |
| BaO | 2.0 | | 2.0 | | 2.0 | | 2.0 | |
| $LaO_{1.5}$ | 2.0 | | 2.0 | | 2.0 | | 2.5 | |
| $SiO_2$ | 2.5 | | 2.5 | | 2.5 | | 10.0 | |
| $FeO_{1.5}$ | | | 10.0 | | 5.0 | | 2.25 | |
| $CuO_{0.5}$ | | | | | 0.75 | | | |
| | Mole Percent | Wt. Percent | Mole Percent | Wt. Percent | Mole Percent | Wt. Percent | Mole Percent | Wt. Percent |
| CaO | 44.06 | 30.29 | 41.38 | 26.95 | 41.16 | 27.35 | 40.74 | 26.27 |
| $Al_2O_3$ | 40.67 | 50.83 | 34.48 | 40.82 | 37.73 | 45.57 | 33.95 | 39.80 |
| $Na_2O$ | 3.39 | 2.58 | 5.17 | 3.72 | 5.15 | 3.78 | 5.09 | 3.63 |
| $K_2O$ | 1.70 | 1.96 | 1.73 | 1.89 | 1.72 | 1.91 | 1.70 | 1.84 |
| MgO | 2.71 | 1.34 | 2.75 | 1.29 | 2.74 | 1.31 | 2.72 | 1.26 |
| BaO | 2.71 | 5.10 | 2.76 | 4.91 | 2.74 | 4.99 | 2.72 | 4.79 |
| $La_2O_3$ | 1.36 | 5.42 | 1.38 | 5.22 | 1.37 | 5.30 | 1.36 | 5.09 |
| $SiO_2$ | 3.40 | 1.50 | 3.46 | 2.41 | 3.43 | 2.44 | 3.40 | 2.34 |
| $Fe_2O_3$ | | | 6.90 | 12.79 | 3.43 | 6.49 | 6.79 | 12.47 |
| $Cu_2O$ | | | | | .515 | .873 | 1.53 | 2.51 |
| Initial Melt Temperature, °F | 2,750 | | 2,600 | | 2,650 | | 2,600 | |
| Glass Casting Temperature, °F | 2,700 | | 2,550 | | 2,600 | | 2,550 | | calcium aluminate in the melt and in a form that will not break the crystal lattice of our ceramic material. Throughout the specification and claims these ingredients shall be called ceramic additives. Some of the ceramic additives that may be used include $Na_2O$, $K_2O$, $Ag_2O$, $Cu_2O$, $La_2O_3$, $ZrO_2$, $SiO_2$, $GeO_2$, $B_2O_3$, $P_2O_5$ etc.

While our ceramic material has the great advantage of transmitting infrared radiation up to six microns this is not necessary and it may be cut off by adding $B_2O_3$, $SiO_2$ or $As_2O_3$ to the glass forming composition.

As to heat treatment, the temperature required to melt the glass forming composition will of course depend upon the selected materials but in general the calcium aluminate glass forming compositions which are useful in carrying out the present invention will melt at a temperature between about 2500° F. and 2800° F.

The temperature at which the melt is cast to form the glass is preferably just slightly above the liquidus temperature and best results are achieved if the casting temperature is not more than 50 to 100° F. above liquidus temperature. Higher casting temperatures may be used but there is no particular advantage in using such higher temperatures.

The temperature employed in the reheating step to form the crystalline ceramic material of our invention will also vary with the materials used in the selected glass forming composition but with the compositions that we have employed the change from amorphous to crystalline state starts to take place above the annealing temperature but below the liquids temperature of the composition. The composition may be held at such temperature until the change from amorphous glass to the crystalline ceramic material is complete and this may occur in several minutes or from 5 to 10 hours, depending on glass composition and temperature.

In reheating the glass, time and temperature appear to be interrelated and control of these two factors will determine whether the crystalline structure will be fine or coarse grained. The initial melt temperature, casting temperature and the time and temperature employed in the reheating step may be readily determined by one skilled in the art.

Some satisfactory glass forming compositions for producing the opaque crystalline ceramic material of our invention are included in the following additional examples of illustrative compositions:

Melts may be made from these compositions in sizes similar to that shown in Example I. The casting temperature to liquidus temperature relationship specified in Example I above is substantially the same for the compositions of Examples II through V.

In the above examples we employ the procedure described in Example I as this has the great advantage of shaping the ceramic material while in glass form but it will be understood that this is not necessary as our crystalline ceramic material may be formed by controlled cooling of the initial melt. In such case the ceramic material is formed directly without the need of going through the reheating step. The ceramic material produced in accordance with Examples I through V was in each case tested and found to be insoluble in water at ordinary atmospheric temperatures.

It will be understood that it is intended to cover all changes and modifications of the preferred form of invention herein chosen for the purpose of illustration which do not constitute departures from the spirit and scope of the invention.

What we claim is:

1. The method of manufacturing a ceramic crystalline material which comprises the steps of heating a glass forming composition which when liquid will provide a melt containing between about 65 to 100 mole percent of $CaO \cdot AlO_{1.5}$, continuing the heating step at a temperature above the melting point of the composition to form a liquid melt, thereafter cooling the melt to a temperature below the liquidus temperature to form amorphous glass and subsequently reheating the amorphous glass at a temperature above the annealing temperature of such glass and holding the glass at such elevated temperature until a crystalline ceramic material is formed.

2. The method specified in claim 1 which includes the steps of pouring the liquid melt into a mold at a temperature not less than the liquidus temperature of the melt, and then cooling the resulting amorphous glass to annealing temperature and holding it at such temperature until the glass is annealed prior to heating such glass above the annealing temperature.

3. The method specified in claim 1 which includes the step of agitating the liquid melt to form a homogeneous composition free of bubbles.

4. The method specified in claim 1 which includes the step of adding a ceramic additive to the glass forming composition in an amount to provide between about 0 to 35 mole percent of such ceramic additive in the melt said ceramic additive being selected from the group consisting of $Na_2O$, $K_2O$, $Ag_2O$, $La_2O_3$, $ZrO_2$, $B_2O_3$.

5. The method specified in claim 1 which includes the step of adding substituted elements to the glass forming composition to provide a melt containing substituted elements in an amount not in excess of about 25% of the specified mole percent of $CaO \cdot AlO_{1.5}$, said substituted element having an ionic radius approximately that of aluminum and being selected from the group consisting of iron, magnesium, strontium and zinc.

6. The method of manufacturing a ceramic crystalline material which comprises the steps of heating a glass forming composition which when liquid will provide a melt containing between about 65 to 95 mole percent of $CaO \cdot AlO_{1.5}$, continuing the heating step at a temperature above the melting point of the composition to form a liquid melt, thereafter cooling the liquid until amorphous glass is formed and then reheating the amorphous glass at elevated temperature above the annealing temperature of the amorphous glass and holding the glass at such elevated temperature until a crystalline ceramic material is formed.

7. The method specified in claim 6 which includes the step of heating the amorphous glass at elevated temperature above the annealing temperature but below the liquidus temperature of the glass.

8. The method of manufacturing a ceramic crystalline material which comprises the steps of heating a glass forming composition which when liquid will provide a melt containing between about 75 to 95 mole percent of $CaO \cdot AlO_{1.5}$, continuing the heating step at a temperature above the melting point of the composition to form a liquid melt and thereafter cooling the melt down to a temperature below the liquidus temperature of the glass forming composition and maintaining the composition at a temperature below the liquidus temperature but above the annealing temperature of the composition until a crystalline ceramic material is formed.

9. The product in accordance with the process of claim 1.

10. The product produced in accordance with the process of claim 8.

11. The method specified in claim 1 which includes the step of adding substituted elements to the glass forming composition to provide a melt containing substituted elements in an amount not in excess of about 25% of the specified mole percent of $CaO \cdot AlO_{1.5}$, said substituted elements having an ionic radius approximately that of calcium and being selected from the group consisting of iron, magnesium, strontium and zinc.

References Cited in the file of this patent

UNITED STATES PATENTS 2,920,971    Stookey _____ Jan. 12, 1960

OTHER REFERENCES

Lea et al.: "The Chemistry of Cement and Concrete," Revised ed. 1956 (pages 190–195, 268–9, 278–9 and 438–9) published by Edw. Arnold, Ltd., England.

Handbook of Chemistry and Physics, 36th ed. (pub. 1954–1955), Chemical Rubber Pub. Co. (pages 488 and 489).

Mellor: Comprehensive Treatise on Inorganic and Theoretical Chemistry, pub. 1924 by Longmans Green and Co., N.Y.C., vol. V (page 292).